United States Patent [19]
Hunter

[11] 3,964,442
[45] June 22, 1976

[54] INTERNAL COMBUSTION ENGINE

[76] Inventor: Lee Hunter, 13501 Ladue Road, Creve Coeur, Mo. 63141

[22] Filed: Feb. 4, 1974

[21] Appl. No.: 439,220

[52] U.S. Cl. .................................. 123/8.45; 418/64
[51] Int. Cl.² .................................... F02B 55/14
[58] Field of Search ................ 123/8.45; 418/61 R, 418/64, 257

[56] References Cited
UNITED STATES PATENTS

| 1,525,364 | 2/1925 | Brett | 123/8.45 |
| 1,854,238 | 4/1932 | Thompson | 74/63 |
| 2,089,593 | 8/1937 | Bailey | 418/257 |
| 3,456,184 | 7/1969 | Kopczynski | 418/59 |
| 3,812,828 | 5/1974 | Griffiths | 418/61 R |

Primary Examiner—C. J. Husar
Attorney, Agent, or Firm—Gravely, Lieder & Woodruff

[57] ABSTRACT

A compact orbital core internal combustion engine comprising a casing defining a working space, a non-rotating but orbiting core body movable in the working space about a principal power output shaft, a plurality of partitions operable between the core body and the casing and arranged to define with the working space between the core and casing a plurality of combustion cells, and a power transmission system in driving relation between the core body and the principal drive shaft for operating the usual accessories, valve mechanisms and any auxilliary devices, in addition to furnishing the power take-off from the engine.

7 Claims, 13 Drawing Figures 3,964,442

INTERNAL COMBUSTION ENGINE

BRIEF SUMMARY OF THE INVENTION

This invention relates to internal combustion engines of the type or class that do not have reciprocating pistons for transmitting the energy of the fuel combustion to a drive shaft.

The reciprocating engine, is of course, most widely used and this is due, for the most part, to the extensive development effort expended on it. However, the reciprocating engine has many problems that constant development has not entirely overcome, and it is a general object to overcome these problems. These problems include an undesirable power to weight ratio, excessive bulk regardless of horse power output, poor fuel economy, and strong tendencies to polute the air.

The non-reciprocating engine, on the other hand, is one with a rotating member that does not periodically reverse directions like a piston. One of the most recent of commercial rotary engines of internal combustion type is the Wankel engine, early disclosed in U.S. Pat. No. 2,988,065, granted June 13, 1961 to Felix Wankel and Ernst Hoeppnar. It is this general type of engine that is being improved upon by the engine disclosed in this application.

The broad general object of this invention, therefore, is to avoid the construction and operational problems of the prior reciprocating and rotary internal combustion engines so that the power output can be greatly increased without increasing the physical size of the engine assembly or encountering the other problems connected with them.

It is also an object of the invention to have a compact arrangement of working components with positive combustion chamber seals aligned always in the optimum positions relative to the surfaces to be sealed to that deleterious angular relationships between the seals heretofore provided and the surfaces to be sealed are avoided.

A further object of this invention is to provide a stationary casing having a simple generally cylindrically shaped space, a core member movable in an orbital manner about the cylindrical space, and seal partitions engaged between the walls of the space and the core member in positions to divide the space for the purpose of defining combustion cells.

Yet another object of this invention is to provide an internal combustion engine having an orbital core movable in a stationary casing to provide a desired number of combustion cells, and valving mechanism to follow the four cycle principle of operation, with the result that there will be evenly spaced power pulses delivered during the orbital motion of the core member.

It is a further object of this invention to provide an internal combustion engine with an orbiting core member in a stationary casing, and to provide pressure seals carried by the orbiting core in positions to seat on flat surfaces in the casing so that the seals will provide the most effective seals throughout the orbital movement of the core member.

In a broad sense the present invention embodies an engine structure having a generally cylindrical combustion chamber receiving a core member which acts as a piston but is characterized in that it has a constant orbital motion about the combustion chamber, cooperating partitions elements operable between the chamber walls and the core to divide the latter chamber into circumfertially spaced independent cells which constitute combustion zones as in a multi-cylinder engine, a power take-off shaft, power transmission means operable between the core and the shaft, and means to prevent the core member from rotating, thereby keeping the core aligned with the rectilinear coordinates for the engine structure.

A preferred embodiment of the present internal combustion engine may comprise a generally cylindrically shaped casing open in the central area, a pair of closure plates secured to the casing at its opposite faces to form an annular space, a core member movable in the annular space between the closure plates, a plurality of crank members having the crank pins engaged in the core member and the crankshafts rotatively mounted in the supporting structure at one of the closure plates, gears on the crankshafts of the crank members arranged to engage a driven gear on the principal power take-off shaft, the respective combustion cells being formed by and between the casing, closure plates, core member and sealing vanes, valves for controlling the operation of the engine, and an organization of cams, lifters, tappets and cam operating gears to operate the valves.

In the embodiment just described the core member transmits the power from the fuel combustion to the crank members which have the crank arms always moving in parallelism so that the core member moves in an orbit in the casing without rotating or tilting, whereby the periphery of the core member always has a close but non-contacting working relationship with the cylindrical wall of the casing during displacement of the core member.

MOre particularly the engine of this invention comprises a housing defining an annular chamber having a peripheral and spaced side face plates, said peripheral wall being formed with recessed flats in circumferentially spaced relation and one of said side face plates being formed with a polygon member located in the axial center of said annular chamber and formed with flat faces presented one to each of said recessed flats, a core member movably in said annular chamber to surround said polygon member, a plurality of crankshafts equal in number to said recessed flats and flat faces and symmetrically spaced about said polygon member, each crankshaft having a bearing shaft supported by one of said side face plates, a crank arm extending therefrom and a crankshaft pin on said crank arm and engaged in said core member such that said core member is constranied to move in an orbital path within said annular chamber, partition means in said housing dividing said annular chamber into cells equal in number to the number of recessed flats, each partition means extending through said core member and being engaged at one end in a recessed flat and at its opposite end on a flat face and all of said partition means being movable from side-to-side on said flats as said core member orbits in said annular chamber, means to seal said partition means with said recessed flats and said core member and to seal said core member with said side faces, valve means on said housing for each of said cells to admit a combustion medium and exhaust the products of combustion, and means driven by all of said crankshafts to transmit power from the combustion medium to the exterior of said engine.

Other embodiments of the present engine will be shown and described in the following specification which will enable those skilled in this art to understand the present concepts.

BRIEF DESCRIPTIONS OF THE DRAWINGS

The present internal combustion engine has been disclosed in certain presently preferred embodiments in the accompanying drawings, whrein:

DETAILED DESCRIPTION OF THE EMBODIMENTS

Figure 1:
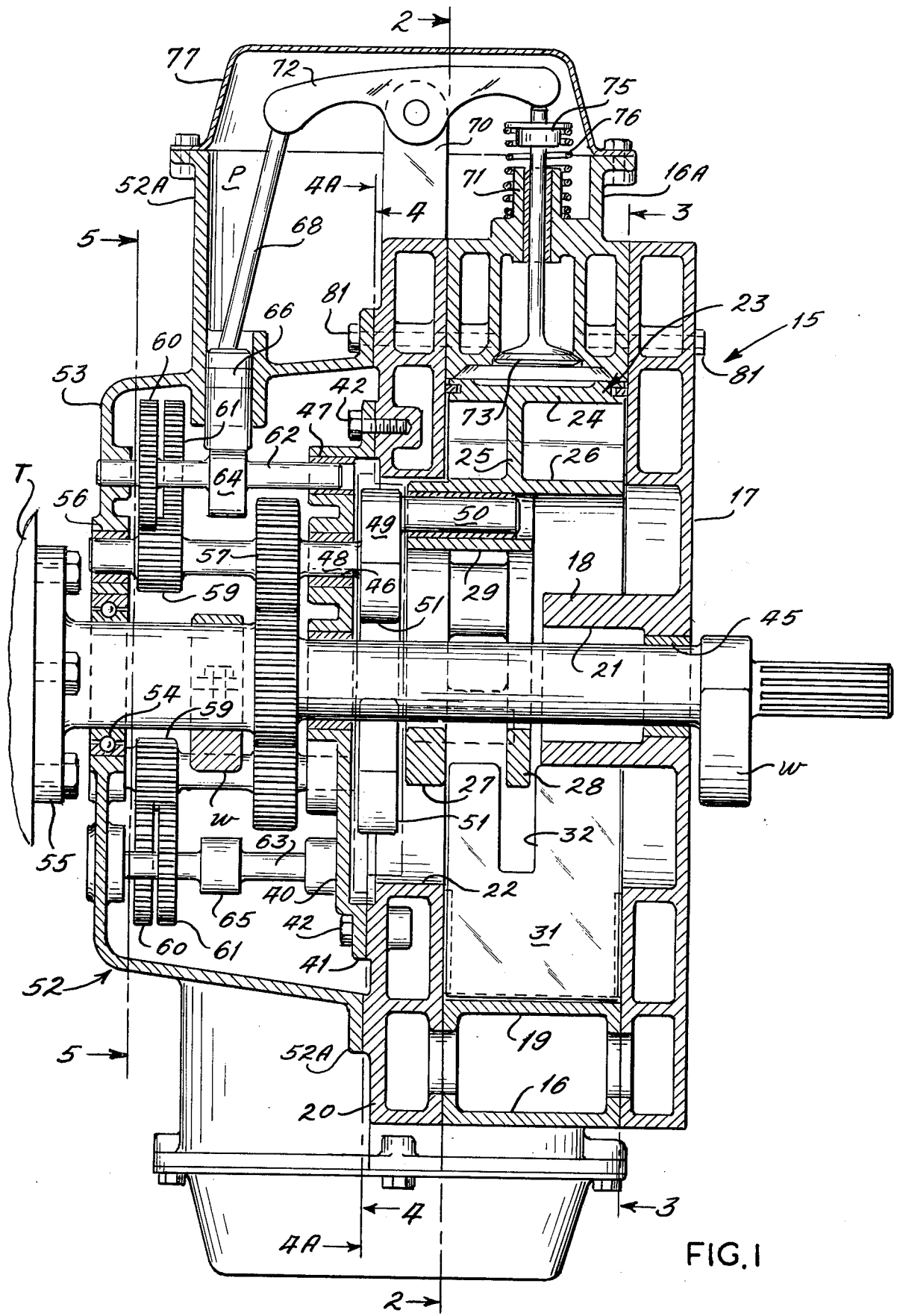
FIG. 1 is sectional elevational view of one form of the present internal combustion engine shown the orbiting core and operative components constituting features thereof.

A presently preferred embodiment of the present internal combustion engine is seen at 15 in FIG. 1, and reference will be made to other views in the drawings as the description proceeds. The engine 15 comprises a frame composed of an annular member 16, having cored out passages for the flow of a suitable cooling medium, and an outer face plate 17 secured to the member 16 so as to locate a polygon bearing element 18 in the center of the space enclosed by the internal circumferential wall 19 of the annular member 16. A second or inner face plate 20 is secured to the opposite side of member 16 so that the two plates 17 and 20 and annular member 16 together form the main parts of the frame. These parts are suitably cored out and provided with passages as shown for the coolant. The outer face plate 17 is closed except for an aperture 21 which penetrates the polygonal element 18. The opposite or inner face plate 20 is in the form of a flat toroid to provide an enlarged opening 22 for a purpose to appear.

Figure 2:
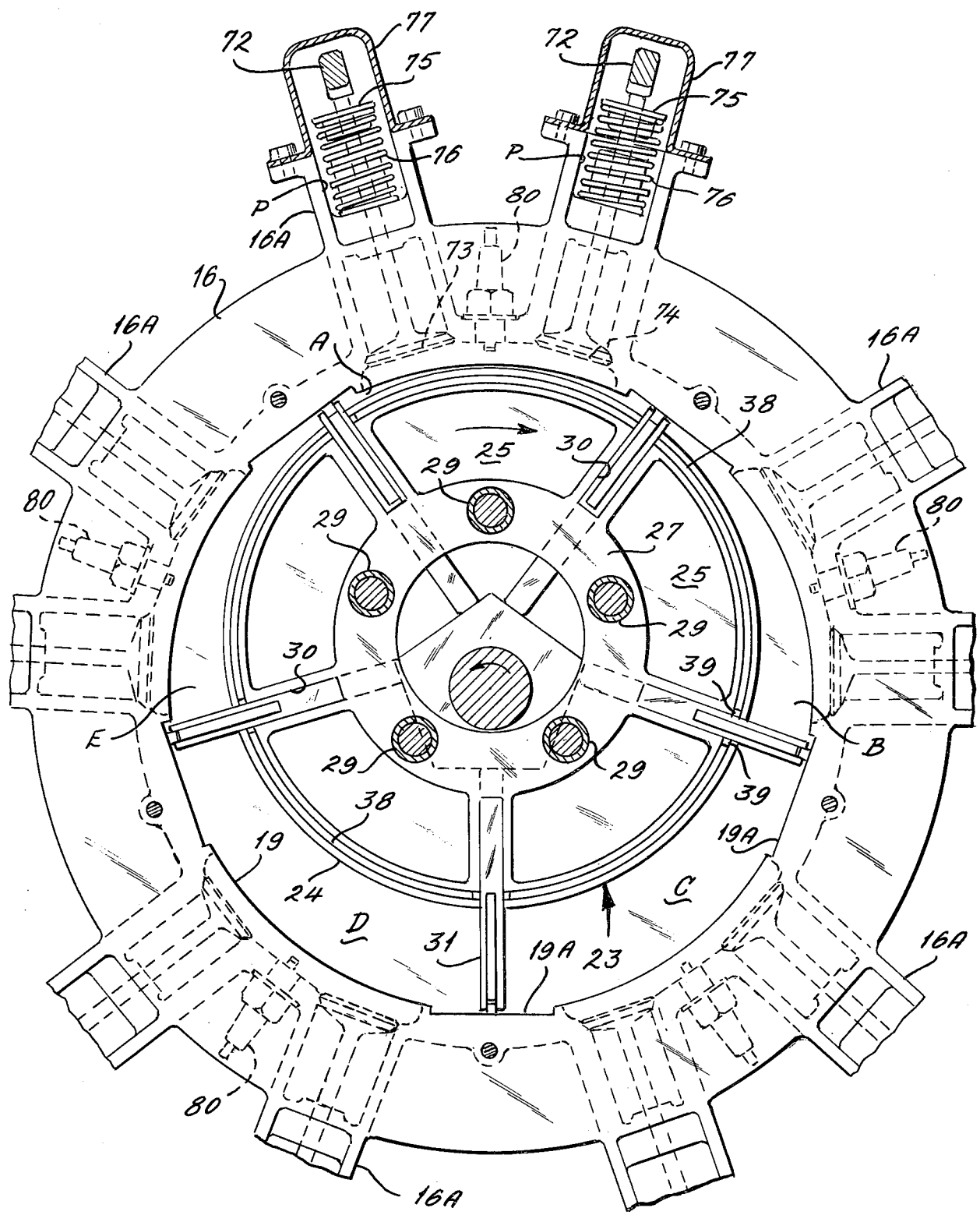
FIG. 2 is a transverse and fragmentary elevational view taken along line 2—2 in FIG. 1.
Figure 3:
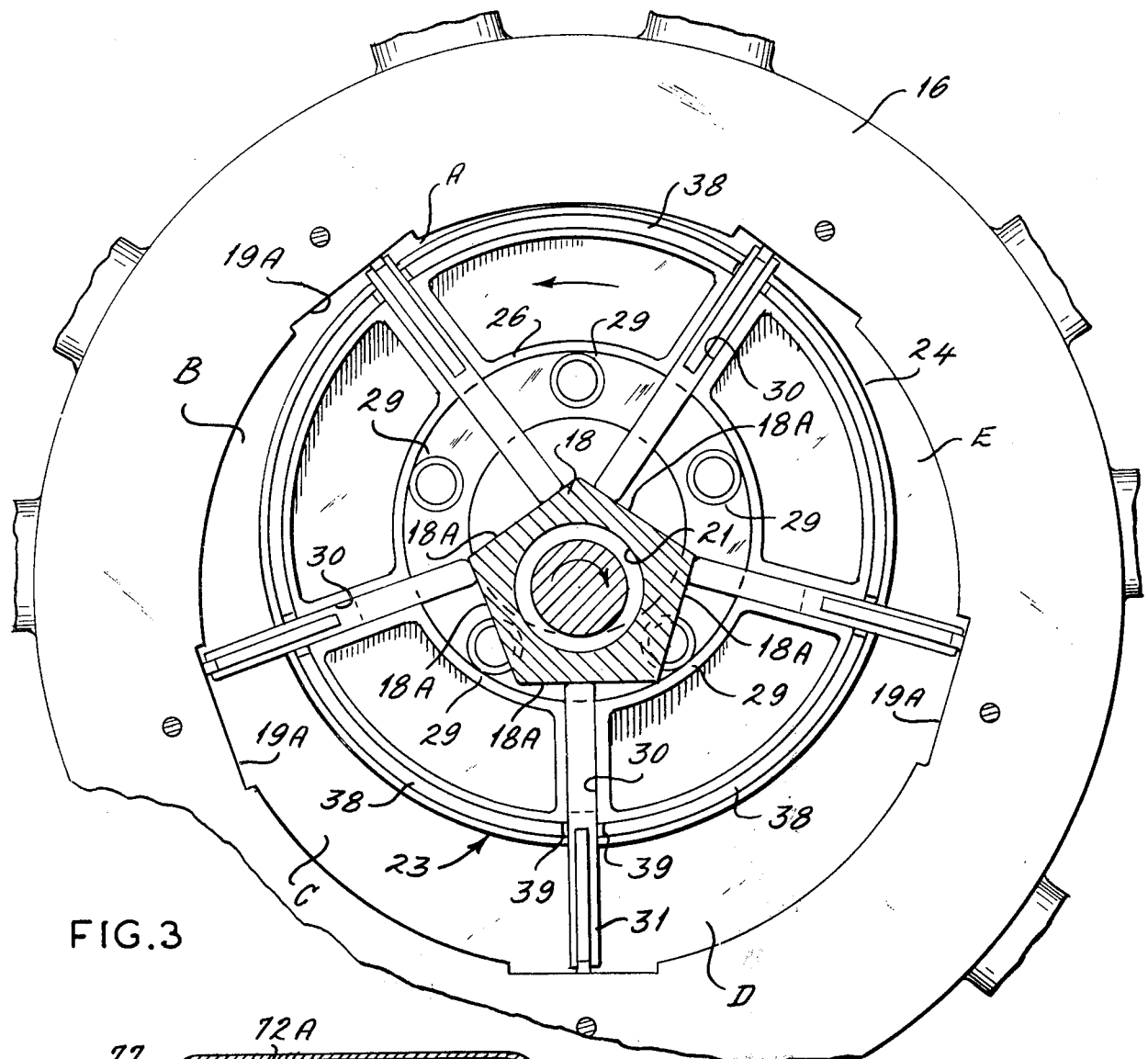
FIG. 3 is a transverse and fragmentary elevational view taken along line 3—3 in FIG. 1 which is opposite to the view in FIG. 2.

The principal power producing component is a core member 23 which is seen in FIGS. 1, 2 and 3. As there shown, the core 23 is formed with a circular rim 24 supported by a radial web 25 intermediate the width of the rim. The radial web 25 connects with an inner circular web 26 that is concentric with the rim 24 and has an enlarged ring 27 extending axially out of the plane of the core into the enlarged opening 22 in the inner face plate 20. The axial ring 27 has a counter part in ring 28 that is a radial extension of the web 25. The rings 27 and 28 are connected at five places around the inner circular web 26 by bosses 29 which are axially drilled to form bearing sockets for the usual crank pins to be described presently.

Figure 3A:
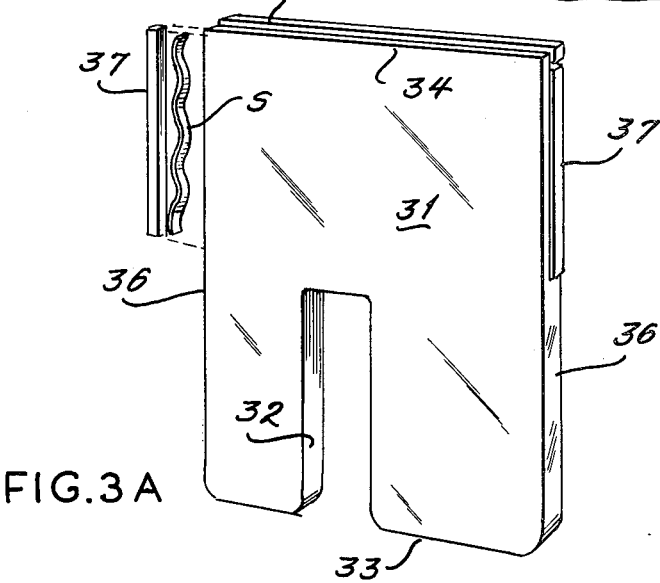
FIG. 3A is a perspective view of a typical partition carried by the orbiting core, a portion of the same being exploded to show a typical resilient means for maintaining the seals in operative position.

The core member 23 is formed with a plurality (five being shown) of radially directed machined slots 30 (FIG. 2) that open outwardly of the outer rim 24 and divide this rim into as many sectors. The slots 30 extend inwardly and open through the inner web 26 and rings 27 and 28 so as to communicate with the inner wall 19 of the annular member 16 and with flat surfaces (FIGS. 2 and 3) 18A on the polygonal element 18. The disclosure of a five sided polygonal element 18 or pentagon, and five machined slots in the core 23 is matched by five machined flat surfaces 19A in the surface 19 of the annular frame member 16. The respective surfaces 18A and radially distant surfaces 19A are parallel and of the same length, and are the same radial diatance apart. Each slot 30 is occupied by a partition member 31 (FIG. 3A) that has a notch 32 formed in its inner edge 33. The outer edge 34 of the member 31 is grooved to receive a seal strip 35, and the side edges 36 are also grooved to receive seal strips 37. Curved grooves are fromed in the respective sides of the core rim 24 to receive seal strips 38, and additional seal strips 39 are disposed at the respective ends of the curved strips 38. The seal strips are pressed into operating positions by wave spring elements, one being shown in FIG. 3A at S, thus effectively sealing all surfaces where there is movement of the seals relative to the core slots 30 and the flat surfaces 19A in the annular frame member 16.

The views of FIGS. 2 and 3 reveal that the frame member 16, core member 23, and the partition members 31 form five combustion cells denominated A, B, C, D and E. The direction of rotation of the core 23 in FIG. 2 is clockwise and, therefore, the combustion cells are lettered in the clockwise direction. Of course, FIG. 3 cell lettering is reversed. Each cell, A through E, is formed between two partition members 31 the details of which can be seen in FIG. 3A. The member 31 is grooved to receive seals, and the seals are held in position by wave springs of the character seen at S.

Figure 4:
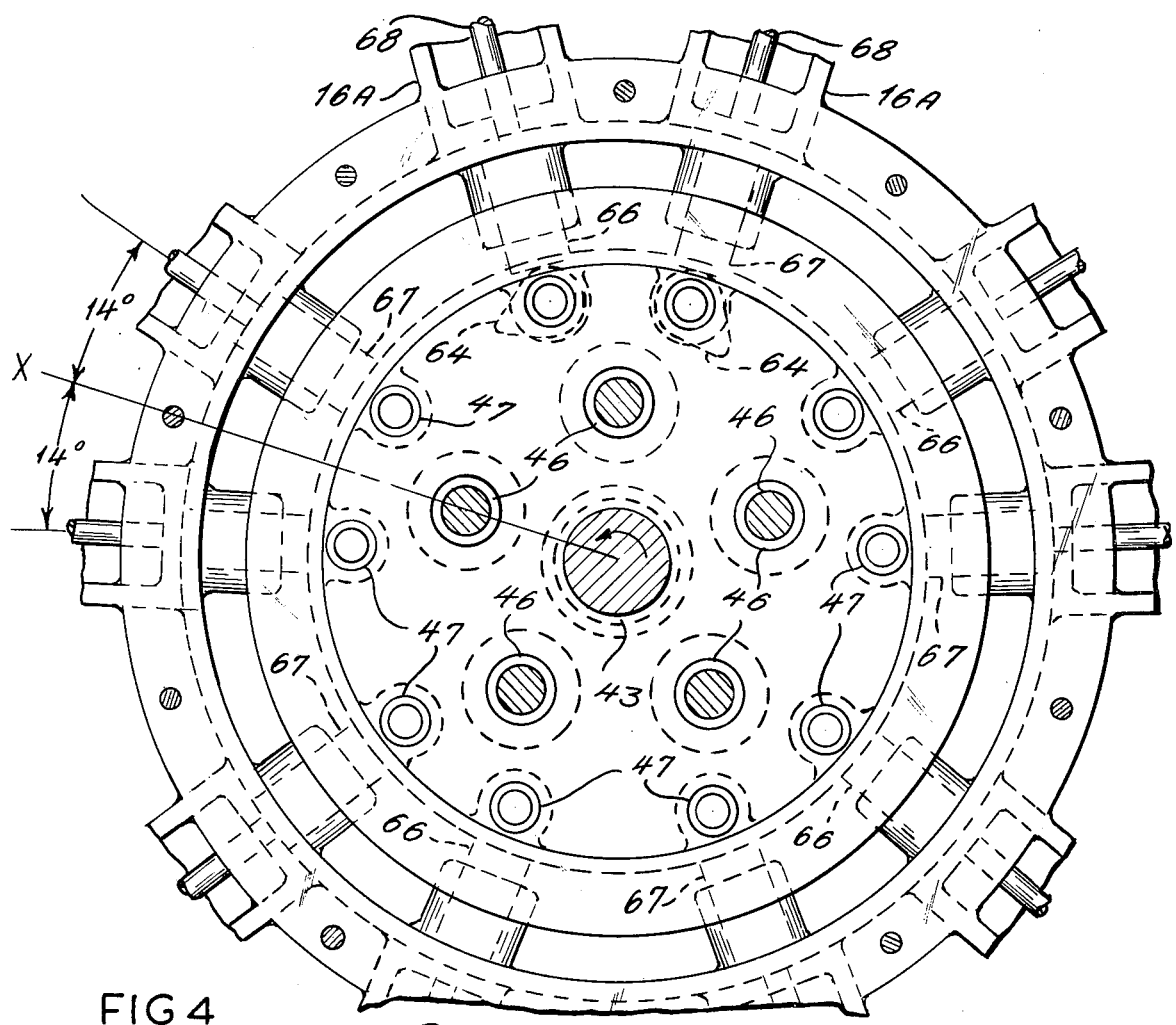
FIG. 4 is a further transverse and fragmentary elevational view taken along line 4—4 in FIG. 1.

In FIGS. 1 and 4 it can be seen that the inner face plate 20 supports a bearing casting 40 secured by its flange 41 and bolts 42. This casting 40 is formed with a central bearing 43 to receive the principal shaft 44, the opposite end portion being mounted in an aligned bearing 45 in the outer face plate 17 and specifically in the polygonal element 18. Radially outwardly of the bearing aperture 43 there is a ring of five bearings 46 evenly spaced around the center bearing 43, each at 72 degrees of arc. Next farther out in this bearing casting 40 there is a ring of ten bearings 47 arranged in pairs, such that each bearing in a pair is 14 degrees off of a center line X (FIG. 4) erected through the center of the shaft 44 and the center of the interposed bearings 46. The respective center lines X are spaced 72 degrees apart so that there are five sets of bearings 46 and related pairs of bearings 47.

Figure 4A:
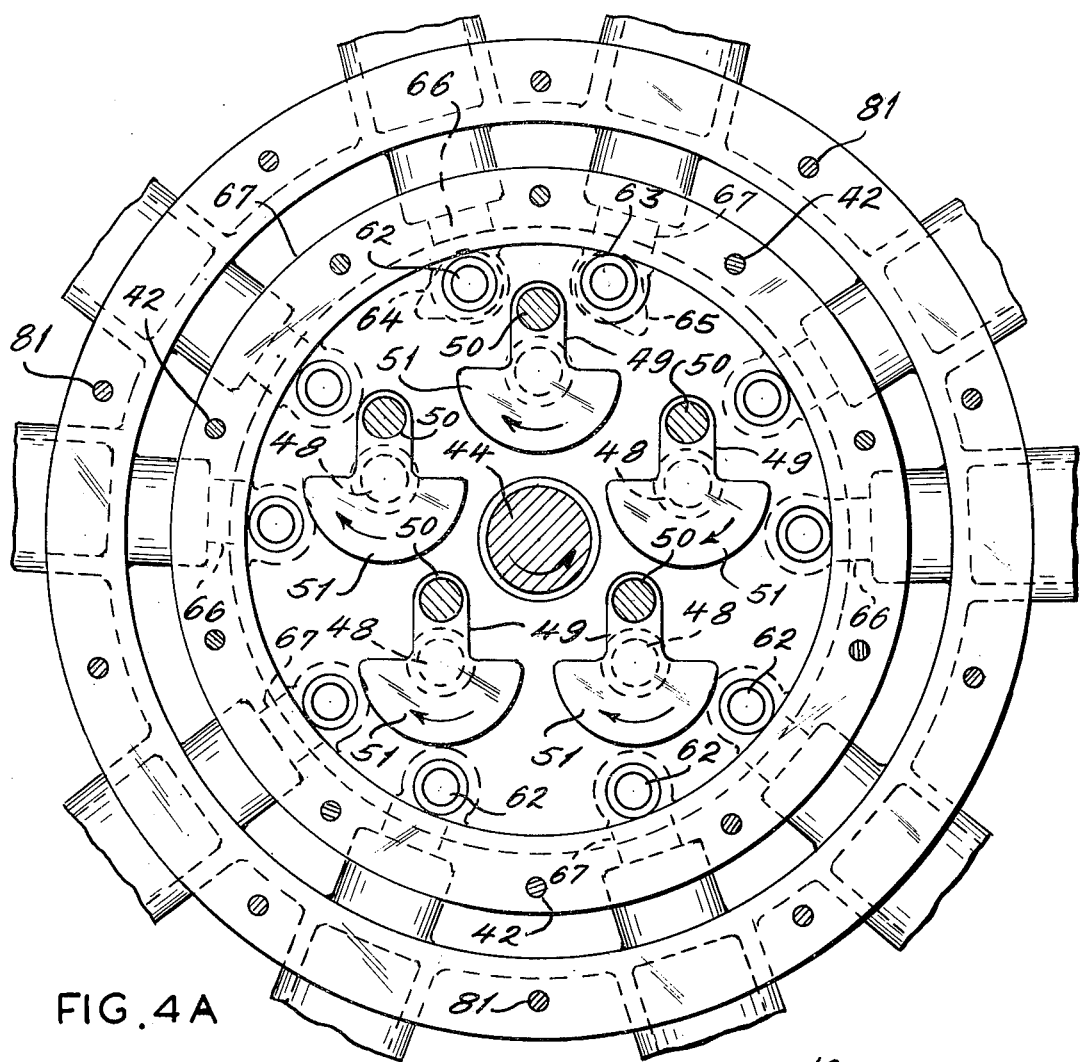
FIG. 4A is a view similar to FIG. 4 but showing the arrangement of the crankshafts for the orbiting core.

The view of FIG. 4A is similar to FIG. 4 but shows the arrangement of crankshafts spaced around the shaft 44, and the gear cluster associated with this assembly. The crankshaft assembly of FIGS. 1 and 4A, includes five similar crankshafts, each having its support shaft 48 mounted in a bearing 46 in the casting 40, a crank arm 49 integral with the shaft 48, and the crank pin 50 engaged in the socket in boss 29 (FIG. 1). The crank arm 49 for each crankshaft has a counterweight 51 for the purpose of balancing the crankshaft. The crankshafts are arranged around the shaft 44 and the crank arms 49 are of a length to function to define the stroke of the core in its orbital movement (non-rotating) within the chamber defined between the inner and outer face plates 20 and 17 and the annular member 16. It can be understood that the orbiting movement of the core 23 results in the crankshafts being rotated in unison so that the crank arms 49 (FIG. 4A) remain in parallel alignment at all times.

Each of the crankshafts 48 extends beyond the bearing casting 40 and into a bell-shaped housing 52 which is carried on the inner face plate at the bolt flange 52A. The outer wall 53 of the housing 52 is suitably apertured at its central area to support an oil seal 54 of split construction so it can be assembled. The shaft 44 extends outwardly of the seal 54 and carries a flange 55 for attachment to the transmission unit T or other device to be driven. The principal bearings for the shaft 44 are seen at 43 in the casting 40 and at 45 in the outer face plate 17. The shafts 48, evenly clustered about the main shaft 44, extend into bearings 56 in the outer wall 53 of the bell housing 52. Each shaft 48 carries a planet gear 57 which meshes with a sun gear 58 on shaft 44, and farther out on shaft 48 is a cam drive gear 59. Each gear 59 meshes with a pair of camshaft gears 60 and 61 (FIG. 5), and each gear 60 drives camshaft 62 while each gear 61 drives camshaft 63. The camshafts 62 rotate inlet valve cams 64 and shafts 63 rotate exhaust valve cams 65. The respective cams 64 and 65 are, of course, oriented so that the lobes are in the proper angular relationship to actuate the associated hydraulic or other type lifter device 66 and 67. The lifters 66 and 67 are carried by the bell shaped casting 52 in circumferentially spaced relation. The lifters 66 are associated with push rods 68 for the inlet valves (FIGS. 1, 5 and 6) and lifters 67 are associated with the exhaust valve push rods 69.

Turning now to FIG. 1 the inner face plate 20 for the engine frame is formed with radially extended posts 70 spaced around the periphery so as to be adjacent the radially extending valve guides 71 formed on the periphery of the annular member 16 of the engine frame. Each post 70 supports a pivoted rocker arm 72, one end being engaged by the push rod 68 for the inlet valve, or by a push rod 69 if for the exhaust valve. The opposite end of each rocker arm 72 is engaged on the outer end of the stem for the inlet valves 73, or for the exhaust valves 74. Each stem is provided with a keeper 75 for a spring 76 that surrounds the valve stem guide 71. In view of the lubrication supplied to the valve stems, rocker arms and associated moving parts, it is necessary for each push rod and rocker arm assembly to be enclosed by a cover 77 (FIGS. 1 and 2) removably mounted on the frame. The covers 77 are spaced apart and extend around the engine.

When assembling the castings, it will appear that the castings 16, 20 and 52 have extensions respectively at 16A, 20A and 52B which are intended to fit together to form a radially open pocket P for each of the push rods and rocker arms and valve springs and guides. These extensions have bolt flanges which support the removable covers 77.

Each inlet valve 73 (FIG. 6) controls the intake of the combustible medium (for example gasoline and air) which is supplied through the intake manifold 78 from a carburetor (not shown) or other fuel and air mixing device. Each exhaust valve 74 allows the products of combustion to escape through an exhaust manifold 79. Though not shown, the inlet manifolds 78 for each inlet valve can be directed axially over the outer face plate 17 (FIG. 1) and collected at a fuel-air mixing device, such as a carburetor. The exhaust manifold 79 can be oppositely directed to extend over the bell-shaped casting 52 and be collected into one or several pipes leading to the usual mufflers for sound attenuation. The complete manifolding system has not been shown, as it is thought to be well understood.

Figure 6:
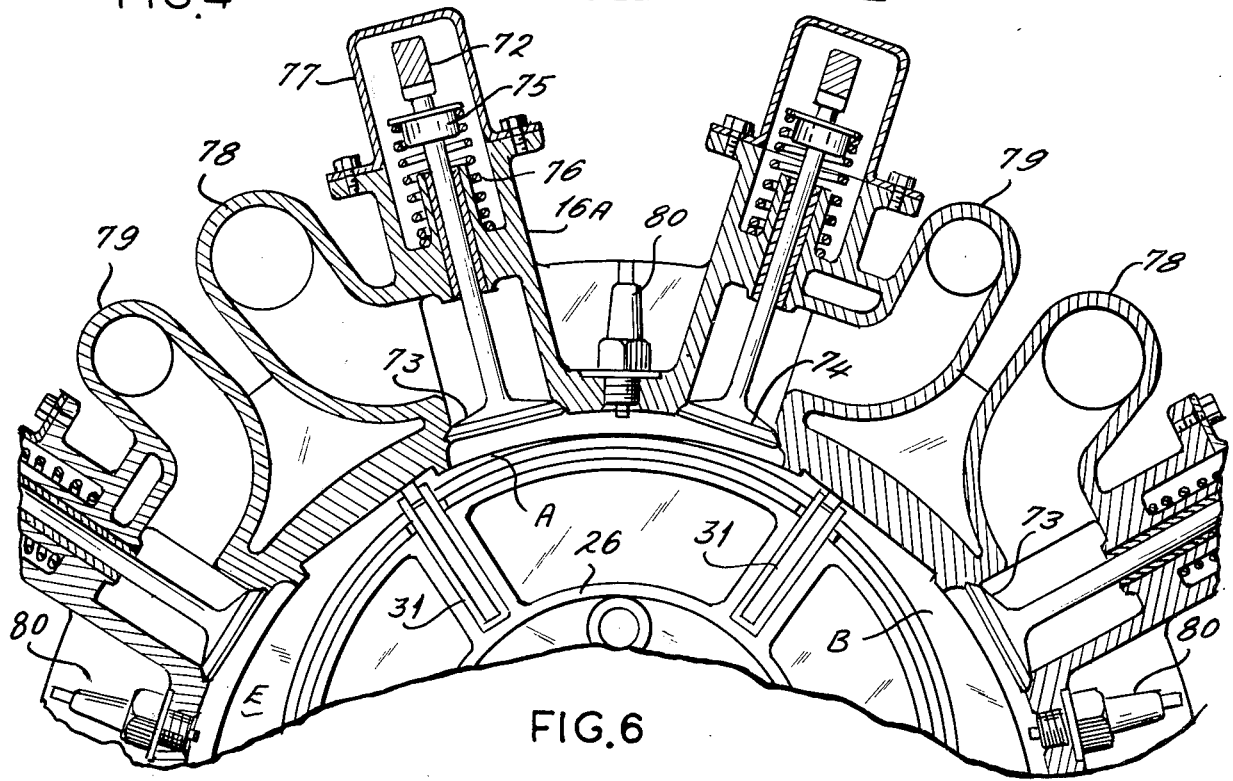
FIG. 6 is a fragmentary sectional view showing a typical arrangement for the intake and exhaust manifolds, these parts being omitted from other views for clarity of disclosure.
Figure 7:
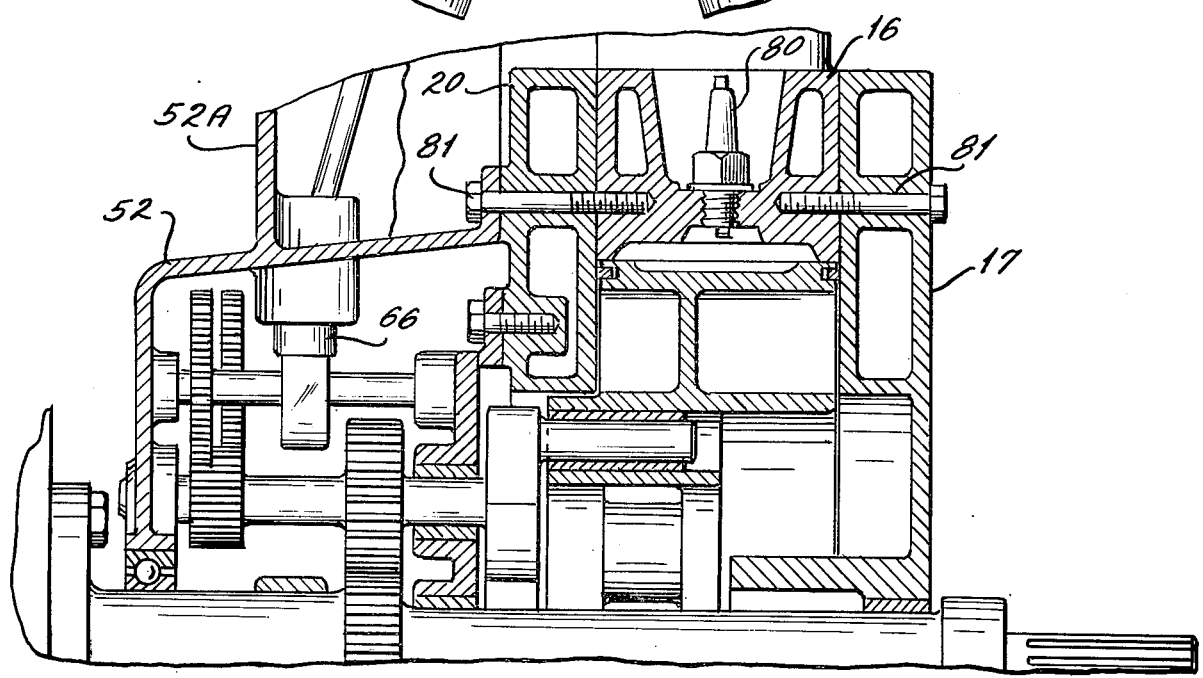
FIG. 7 is a fragmentary sectional view of the assembly of the engine frame castings.

The views of FIGS. 2, 6 and 7 show a spark igniter device 80 disposed between an inlet and an exhaust valve. There is one such device 80 for each combustion cell A through E shown in FIG. 2. In addition FIGS. 4A and 7 illustrate how the castings 16, 17, 20 and the bell-shaped housing 52 can be secured by a plurality of suitable bolts 81.

Figures 8, 9:
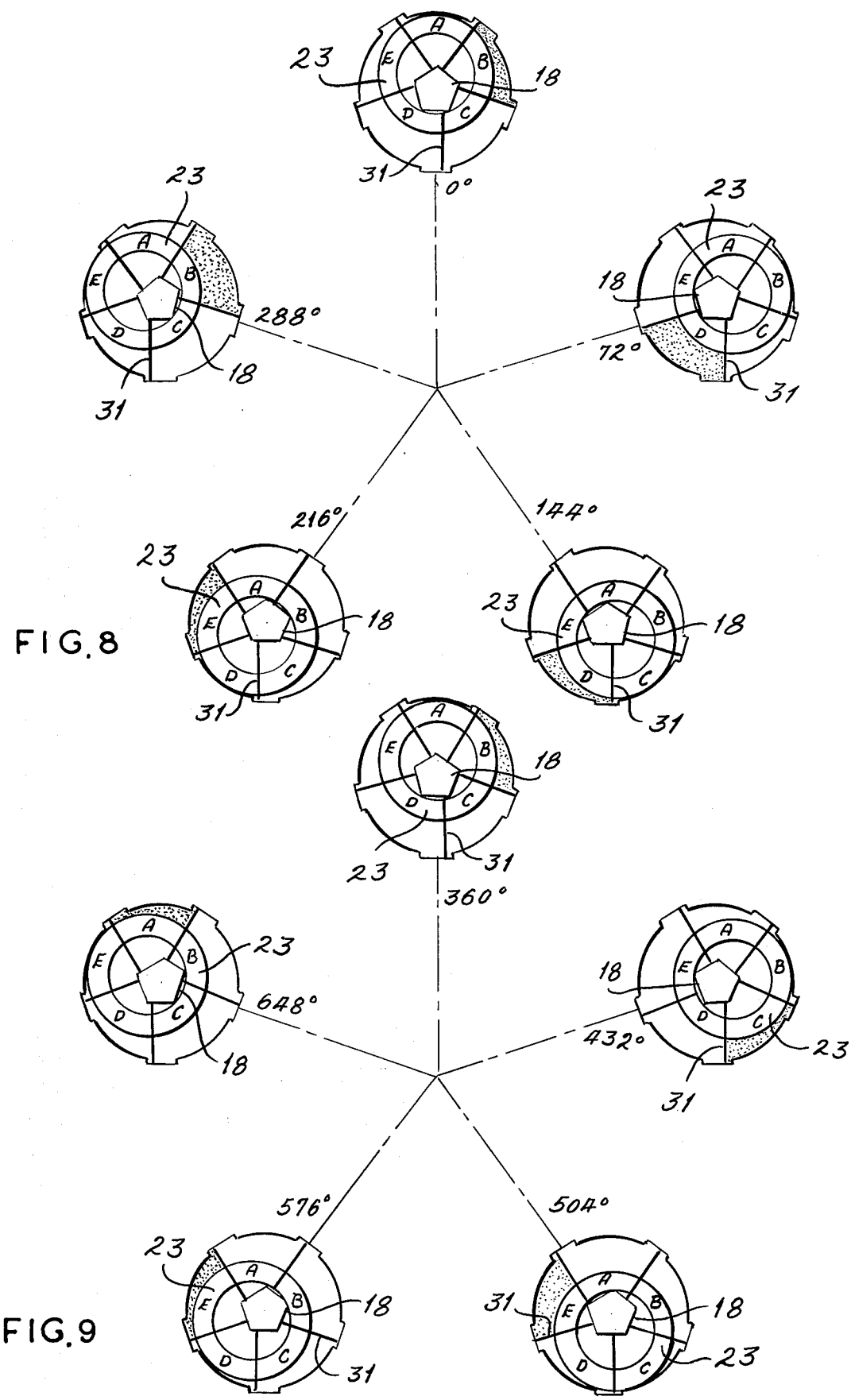
FIGS. 8 and 9 are schematic diagrams of the firing order for a five cell internal combustion engine of the character seen in FIG. 1, the diagrams taken together presenting two complete orbits of the core.

FIGS. 8 and 9 are schematic diagrams of the firing order for the engine of FIG. 1. It is necessary to understand from FIG. 1 that the orbiting core 23 is intended to move in a clockwise direction when viewed from the power take off flange 55. The crankshafts 48 rotate in a clock-wise direction, and the main shaft 44 and its sun gear rotate counter clockwise. The cam drive gears 59 (FIG. 5) rotate in a clock-wise direction as each is fixed to a crankshaft 48. The result is that the cam gears 60 and 61 rotate in a counter clockwise direction. In a five cell orbital core engine, the working face of the core in each cell extends over about 72°. Therefore, the location of the valves and igniter plug is repeated every 72° so that the diagrams of FIGS. 8 and 9 show the position of the core 23 at every 72° for two complete orbits of the core. The events of compression, ignition and expansion, exhaust, and intake, are illustrated in FIGS. 8 and 9, but are better understood when considered in conjunction with the following chart of the events taking place in each cell A, B, C, D and E for two complete orbits of the core 23 when operating on the 4-cycle principle.

| ANGLE | CELL A | CELL B | CELL C | CELL D | CELL E |
|---|---|---|---|---|---|
| 0° | POWER* | EXHAUST | COMPRESS | EXHAUST | INTAKE |
| 72° | POWER | INTAKE | COMPRESS | EXHAUST | INTAKE |
| 144° | EXHAUST | INTAKE | POWER* | EXHAUST | COMPRESS |
| 216° | EXHAUST | INTAKE | POWER | INTAKE | COMPRESS |
| 288° | EXHAUST | COMPRESS | EXHAUST | INTAKE | POWER* |
| 360° | INTAKE | COMPRESS | EXHAUST | INTAKE | POWER |

| | | | | | |
|---|---|---|---|---|---|
| 432° | INTAKE | POWER* | EXHAUST | COMPRESS | EXHAUST |
| 504° | INTAKE | POWER | INTAKE | COMPRESS | EXHAUST |
| 576° | COMPRESS | POWER | INTAKE | POWER* | EXHAUST |
| 648° | COMPRESS | EXHAUST | INTAKE | POWER | INTAKE |

POWER: IGNITION AND EXPANSION, ALL VALVES CLOSED.
IGNITION: *
EXHAUST: EXHAUST VALVE OPEN, INLET VALVE CLOSED
INTAKE: INLET VALVE OPEN, EXHAUST VALVE CLOSED
COMPRESSION: ALL VALVES CLOSED

The above chart illustrates the substantially uniform development of power from each cell, with an overlap as the expansion in one cell continues until ignition has occured in the next cell. The firing order according to the designation of the cells in FIGS. 3, 8 and 9 is the following: A, C, E, B, D. It is of course, understood that the valves for a given cell will be closed during the period of compression and power, the exhaust valve will then open and finally the intake valve will open when the exhaust valve closes. The cams for the intake and exhaust valves for a given cell will be oriented so that the four cycles above outlined take place in proper sequence and during the proper angular position of the core 23. Generally the core moves through an angle of 180° during compression, an angle of 180° during ignition and power delivery, an angle of 180° during the exhaust, and an angle of 180° during suction. The exhaust valve cam 61 for cell A (FIG. 5) will have its lobe oriented so that when the core 23 (FIG. 8) reaches the bottom position 180° from top dead center (TDC) the lobe will begin to open the exhaust valve 74. That lobe orientation will be about 135° away from a position directly under the lifter 67 and the exhaust valve 74 will close when the lobe has traveled another 45°. Thereafter the valve will remain closed for about 270° of cam rotation which is about 540° of core movement. The exhaust cams 61 for the other valves 74 will function in the same manner, but progressively later in angular orientation by 72°, and the inlet valve cam 60, for example, for cell A will be oriented so that its lobe will trail the exhaust cam lobe by about 90°. It is believed unnecessary to show the cam orientation for each of the cells B, C, D and E, as this will be clearly understood from the description for cell A.

Figure 10:
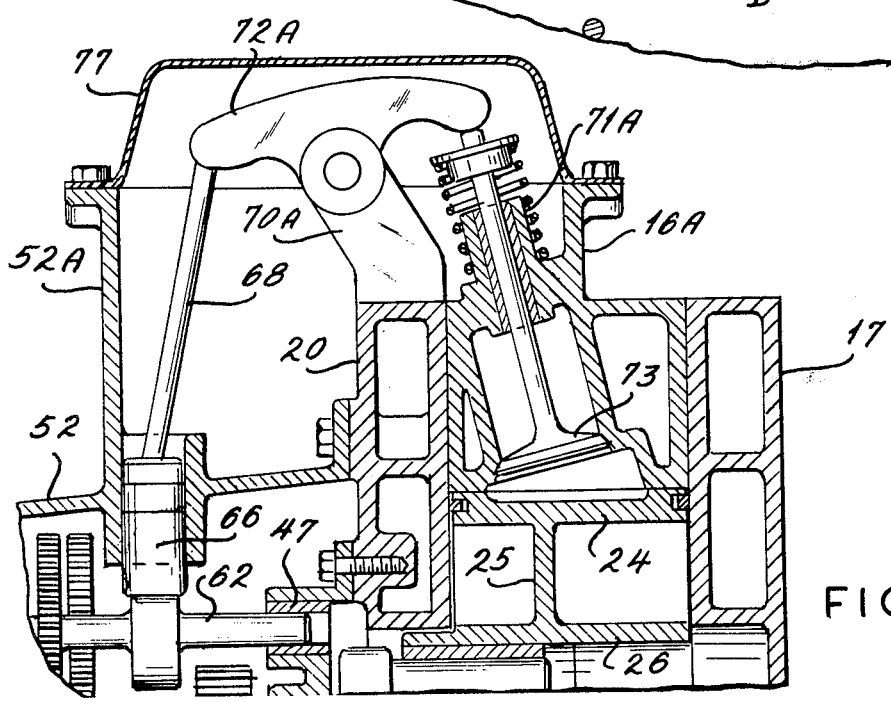
FIG. 10 is a fragmentary sectional elevational view of a modified arrangement for the valving and combustion chamber of an engine of the character seen in FIG. 1.

The engine of FIG. 1 depicts an arrangement where the valves are radially oriented. However, it may be desirable to be able to shape the combustion chamber, and this is shown in FIG. 10 where the valve 73 may be tilted. This requires a redesign of the orientation of the valve stem guides 71A, the posts 70A and the rocker arms 72A. In other respects the view of FIG. 10 is similar to FIG. 1 and like numerals will be used wherever possible to identify similar parts, members and components.

Figure 5:
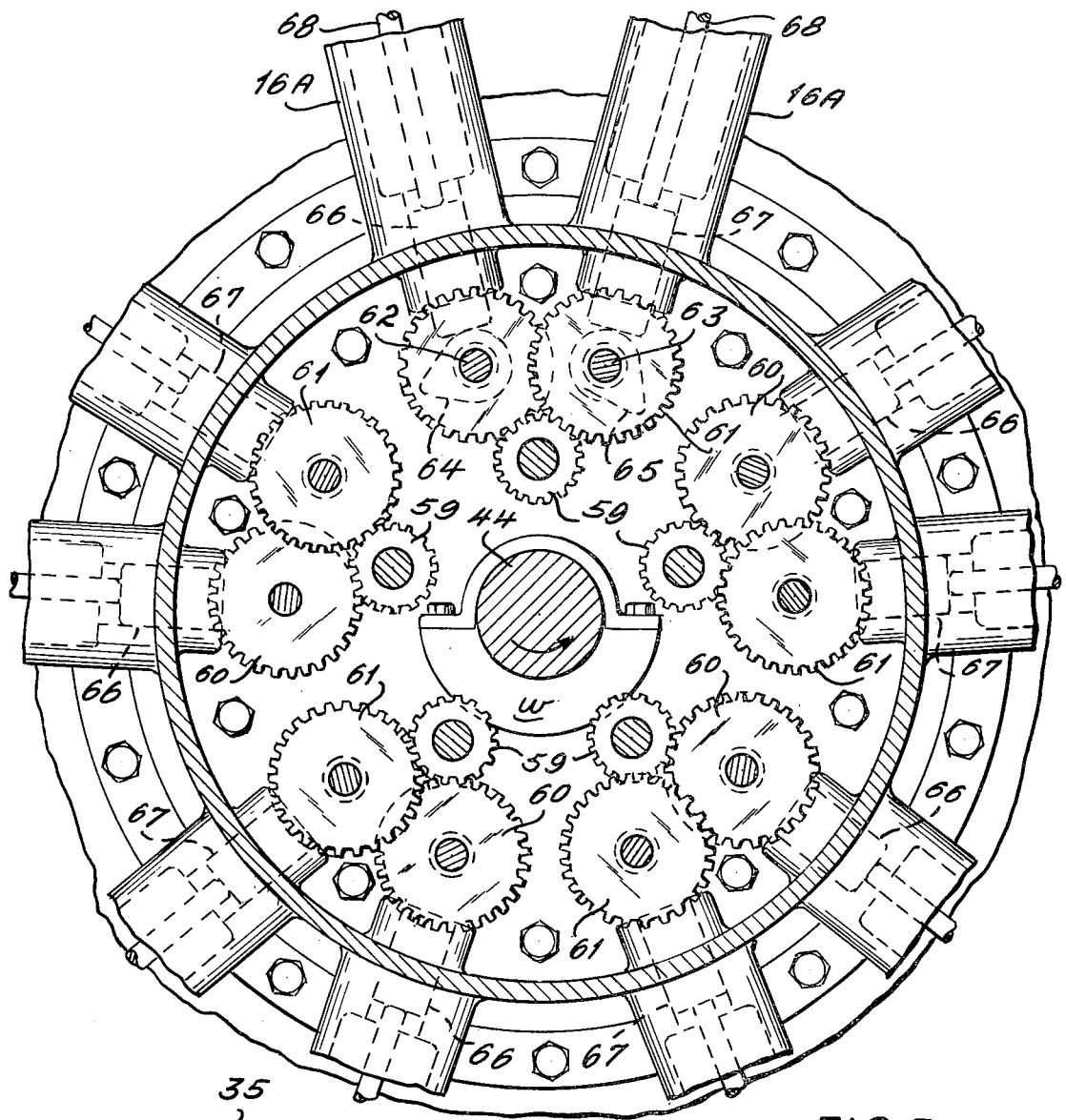
FIG. 5 is a fragmentary sectional view of the gear arrangement for actuating the valve lifters and assembly for each of the push rods circumferentially spaced around the frame of the internal combustion engine seen in FIG. 1.
Figure 11:
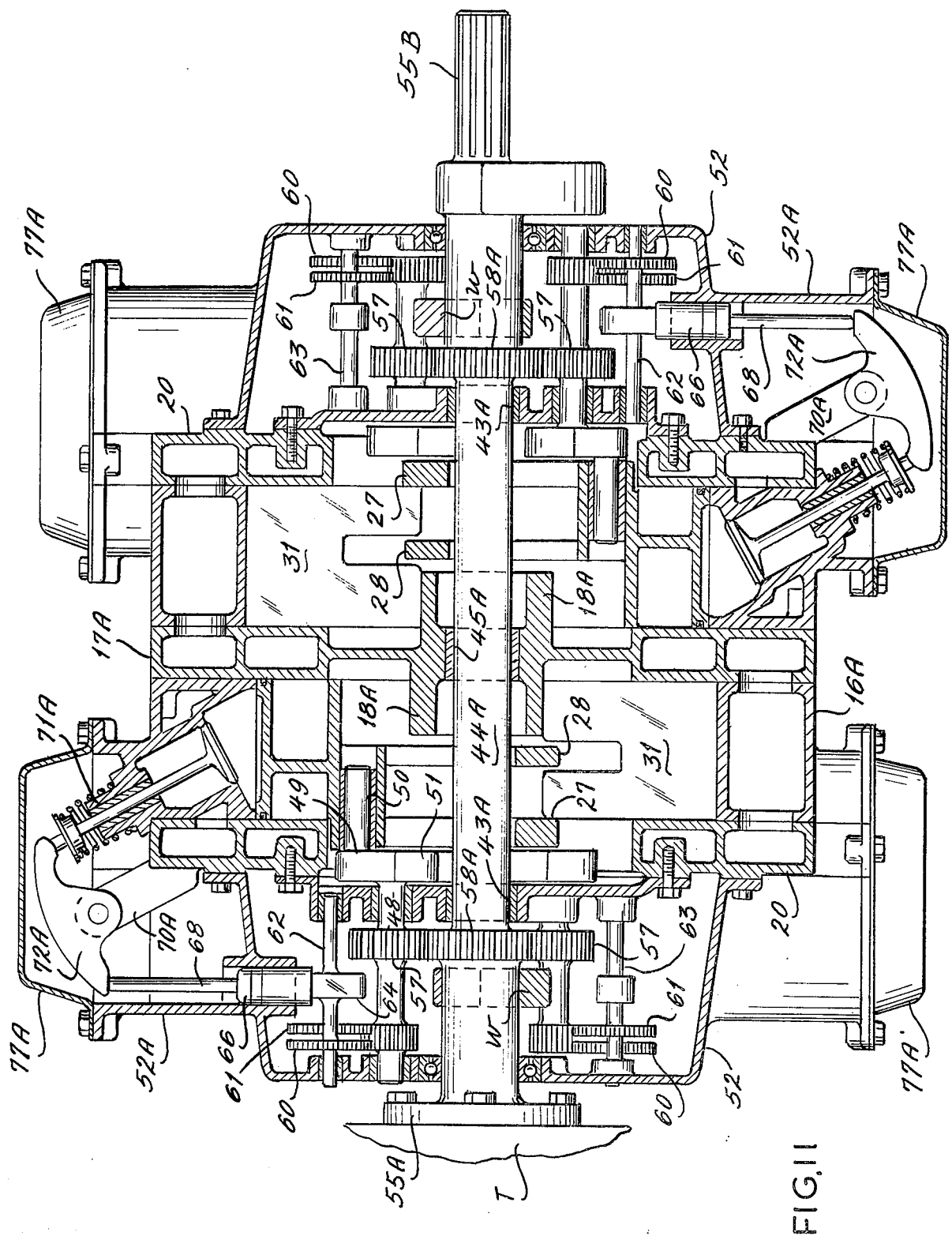
FIG. 11 is a sectional elevational view of a modification of the engine of FIG. 10 wherein two orbiting cores are arranged in tandem for driving a common shaft.

The modification seen in FIG. 11 comprises the arrangement of a pair of single core engines coupled in tandem, and the components therein which are similar to the components heretofore described in FIGS. 1 and 10 will be similarly numbered. The tandem engine is made up of the engine of FIG. 10 for the left portion, in that the annular member 16A, face plate 20 and housing 52 are the same. The various parts operably mounted in these housing members are also similar to the parts shown in FIGS. 1 and 10, and are so numbered. The right hand portion of the tandem engine is composed of an engine similar to the left hand engine and the parts are also similarly numbered. The two engines are united by a modified face plate 17A which is formed with oppositely directed polygonal members 18A. The polygonal members are oriented to be 180 degrees out of alignment. A modified shaft 44A is needed to span the axial length of the tandem engines. The left hand end portion of shaft 44A carries a sun gear, 58A and outboard of the sun gear is the flange 55A adapted to be joined with the transmission unit T. The right hand portion of the shaft carries a sun gear 58A, and outboard of the sun gear the shaft is formed with a projecting end 55B suitably formed to be connected with the usual engine accessories associated with a liquid cooled, spark ignition engine. It is not believed necessary to show the accessories. The shaft 44A has three main bearings seen at 45A in the middle and at 43A adjacent the sun gears 58A. Suitable balance weights W are mounted on the shaft 44A, and similar balance weights W are seen on the shaft 44 in the engine of FIG. 1, and as is shown in FIG. 5 the weight W is split and secured by a clamp element so the weight may be oriented as required.

While the foregoing description has set forth an internal combustion engine with five combustion cells, and with a tandem arrangement of two five cell engines, it is within the contemplation hereof that other similar engines may be designed having a plurality of cells in other than an arrangement of five cells, although the odd number of five cells is presently preferred. A feature of importance is that the principal shaft to be driven by its sun gear is engaged by a plurality of satellite gears which respond to the orbital movement of the core or cores (FIG. 1 or FIG. 11), as the case may be. This arrangement brings many more gear teeth into engagement and increases the reliability and life of the gears. Other important features will be recognized from the foregoing description setting forth structural details that have unique capabilities for engines of the character having orbiting cores.

What is claimed is:

1. An internal combustion engine comprising: a stationary housing defining an annular chamber having a peripheral wall and spaced side face plates, said peripheral wall being formed with recessed flats in circumferentially spaced relation and one of said side face plates being formed with a fixed member located in the axial center of said annular chamber and formed with flat faces presented one to each of said recessed flats, a core member movable in said annular chamber to surround said fixed member, a plurality of crankshafts spaced about said fixed member, each crankshaft having a bearing shaft supported by one of said side face plates, a crank arm extending therefrom and a crankshaft pin on said crank arm and engaged in said core member such that said core member is constrained to move in an orbital path within said annular chamber, partition means in said housing dividing said annular chamber into cells, each partition means extending through said core member and being engaged at one end in a recessed flat and at its opposite end on a flat face and all of said partition means being movable from side-to-side on said flats as said core member orbits in said annular chamber, means to seal said partition means with said recessed flats and said core member and to seal said core member with said side faces, valve means on said housing for each of said cells to admit a combustion medium and exhaust the products of combustion, and power output shaft means driven by all of said crankshafts to transmit power from the combustion medium to the exterior of said engine, said drive shaft means being suppported by said fixed member and the other one of said side face plates.

2. The internal combustion engine of claim 1, and wherein each partition means extends the width of said annular chamber between said side face plates and each has a radial length to span the distance between said recessed flats and said flat faces, said core member having slots therein to receive said partition means and retain said partition means substantially perpendicular to said recessed flats and side face plates.

3. An internal combustion engine comprising: a stationary frame having spaced side walls and a peripheral wall defining an annular chamber, a bearing element carried by one side wall in position substantially centered to said annular chamber, bearing means on said other side wall aligned with said bearing element, a power output shaft extending through said annular chamber and supported by said bearing element and bearing means for rotation therein, a core member disposed eccentrically in said annular chamber surrounding said bearing element and power output shaft, a plurality of crankshafts supported by said bearing means and overlapping said power output shaft in circumferentially spaced relation, each of said crankshafts having a crank pin engaged in said core member, gear means on said crankshafts and on said power output shaft in meshing engagement to transmit motion of said core member to said power output shaft, partition means slidably engaged in said core member and extending between said side walls and said peripheral wall, said partition means being circumferentially spaced around said core member to divide said annular chamber into a plurality of combustion cells, valve means operably carried by said frame at each cell, valve operating means connected to said valve means and to said crankshafts, certain of said valve means for each combustion cell admitting a combustible medium and certain others of said valve means allowing exhaust of the products of combustion from each combustion cell, and combustion ignition means at each combustion cell.

4. The internal combustion engine recited in claim 3, and in which said core member has an annular body formed with an axially offset ring adjacent said bearing means on said other side wall, and bearing sockets carried by said offset ring to receive said crank pins.

5. The internal combustion engine recited in claim 4, and in which said other side wall is formed with a central opening, said bearing means is mounted over said central opening, and said offset ring on said core member body is located in said central opening.

6. The internal combustion engine recited in claim 3, and in which said frame includes a housing enclosing said other side wall and said bearing means, and said valve operating means is supported in said housing and said bearing means.

7. The internal combustion engine recited in claim 3, and in which there is a second internal combustion engine combined with the first recited engine, said second engine having, a stationary frame comprising a second side wall and a second peripheral wall defining a second annular chamber in combination with said one side wall, a second bearing element carried by said one side wall opposite said first recited bearing element, second bearing means on said second side wall, said power output shaft extending through said second annular chamber and being supported in said second bearing means, a second core member in said second chamber surrounding said power output shaft, partition means slidably engaged in said second core member and defining combustion cells within said second chamber, second valve means operably carried by said second frame at each of said cells in said second chamber, a second plurality of crankshafts supported by said second side wall and overlapping said power output shaft in circumferentially spaced relation, said second plurality of crankshafts being operably connected to said power output shaft and to said second valve means, and combustion ignition means at each of said second mentioned combustion cells.

* * * * *